United States Patent [19]

Boerger et al.

[11] Patent Number: 4,650,929
[45] Date of Patent: Mar. 17, 1987

[54] COMMUNICATION SYSTEM FOR VIDEOCONFERENCING

[75] Inventors: Georg Boerger; Götz Romahn, both of Berlin, Fed. Rep. of Germany

[73] Assignee: Heinrich-Hertz-Institut für Nachrichtentechnik Berlin GmbH, Fed. Rep. of Germany

[21] Appl. No.: 706,718

[22] Filed: Feb. 28, 1985

[30] Foreign Application Priority Data

Feb. 29, 1984 [DE] Fed. Rep. of Germany ....... 3407857

[51] Int. Cl.$^4$ ............................................. H04N 7/14
[52] U.S. Cl. ..................................... 358/86; 358/85; 358/183; 379/54
[58] Field of Search ............. 179/2 TV, 2 TS, 18 BC; 358/85, 183

[56] References Cited

U.S. PATENT DOCUMENTS

| 3,705,269 | 12/1972 | Audesirk et al. | 179/2 TS X |
| 3,718,770 | 2/1973 | Reese | 179/2 TS X |
| 4,004,084 | 1/1977 | Brown et al. | 179/2 TS X |
| 4,197,429 | 4/1980 | Sparber | 179/18 BC |
| 4,266,242 | 5/1981 | McCoy | 358/183 X |
| 4,409,618 | 10/1983 | Inaba et al. | 358/183 |
| 4,499,578 | 2/1985 | Marouf et al. | 179/18 BC X |

OTHER PUBLICATIONS

Bergsten et al, "Experimental Video Service Network", *Tele*, Sweden, vol. 84, No. 3, (1978) pp. 1-15.

Friedrich Ohmann, "Kommunikations-Endgeräte", pp. 414-423, Springer Publishing, Berlin, 1983.
N. D. Kenyon, "Videoconferencing", *British Telecommunication Technology Journal*, vol. 2, No. 2, Apr. 1984, pp. 5-18.
Peter McManamon, "Technical Implications of Teleconference Service", *IEEE Transactions on Communications*, vol. Comm. 23, No. 1, Jan. 1975, p. 38.
Gordon Heffron, "Teleconferencing Comes of Age", *IEEE Spectrum*, Oct. 1984, pp. 61-66.

*Primary Examiner*—Keith E. George
*Attorney, Agent, or Firm*—McGlew and Tuttle

[57] ABSTRACT

A system for videoconferencing saves travel time and money. To enable participants to see each other continually and simultaneously, and to show documents and objects, equipment is needed, the costs of which vary with the number of locations to be interconnected, and with measures taken for reducing the needed transmission capacity and the outfit of each terminal. As in known videoconference systems, such as studio, or working place systems, the video and audio signals are switched and/or mixed in the inventive system. The necessary equipment, however, is no longer needed at the respective locations, if a central station for videoconferencing is provided which includes this equipment only in a volume actually necessary for the conference. Each of the connected participant locations only comprises terminal units, the same which are needed for a picture telephone system. In addition, both the video and the audio reception can individually be controlled from each location.

15 Claims, 13 Drawing Figures

COMMUNICATION SYSTEM FOR VIDEOCONFERENCING

FIELD AND BACKGROUND OF THE INVENTION

The present invention relates in general to telecommunication equipment and in particular to a new and useful system for conducting a videoconference between a plurality of participants who are physically present at different locations.

A comprehensive review of the prior art in this field is given in the German publication *Kommunikations-Endgerate Grundlagen, Verfahren, Bausteine, Gerate, Systeme* (Communication Terminals-Fundamentals, Methods, Building Blocks, Systems) by Friedrich Ohmann, Springer publishing house, Berlin, Heidelberg, New York, Tokyo 1983, chapter 7.5 "Bildkonferenz" (Videoconference) pages 414–423. According to that source, what is required of such conferences is that all subscribers (interlocutors/participants) see and hear each other during the whole time-simultaneously, and in the correct direction, and be able to show one another written documents and objects. Besides the minimum technical equipment necessary at every location for carrying out the conference, the costs of terminals and their interconnections increase in an unjustifiable proportion with the number of interconnected locations, if no particular measures are taken, yet all of such measures have their advantages and disadvantages.

To reduce these costs, particularly such as relate to the taking, transmitting, and reproducing of pictures, measures such as parallel processing and switching, and mixed forms developed therefrom, may be provided. With the first mentioned measure, the number of needed terminals and channels can be reduced, but always several conference participants are required to be present together at the location. With the other means, a single picture must always be transmitted to all of the interlocutors, and while no full interconnection is required, nevertheless a continual voice-controlled or manual switching is necessary, preferably by one of the participants.

A solution, considered trivial, and requiring everyone of the participants to be equipped with complete terminals, such that picture and sound from one participant is transmitted individually to all other locations of the conference and there reproduced with an individual loudspeaker and screen, must certainly be rejected as unjustifiably expensive. That is why prior art videoconferencing systems have been limited to arrangements where the interlocutors are concentrated at two locations between which a point-to-point communication for picture and sound in the two directions is established (studio conference, committee room conference). Even in systems designated "working place conference", the main communication, for example through a public network, is established between two localities, with the individual working places being in the same buildng or at the same location, each equipped with a minimum of terminals and being connected together within each of the localities through concentrators.

Prior art videoconferencing therefore has remained restricted to conferences between two regional groups of participants.

SUMMARY OF THE INVENTION

The present invention is directed to a system for permitting a kind of working place conference between participants at different, mutually independent locations, and therefore, goes partly back to the already mentioned solution, which is trivial in itself, of interconnecting the individual locations by communication means in a manner such that all video and sound signals of each of the locations can pass to all the other locations. It must be ensured, as before, that all the participants can see and hear each other continually and simultaneously and can show written documents, objects, etc. However, the requirement mentioned above that the participants look at one another in the correct direction applies only to several participants present at the same location and is therefore substantially irrelevant for individual participants using a terminal exclusively.

The excessive costs which might have been expected with such a solution do not materialize if the features of the present invention are provided.

Accordingly, an object of the present invention is to provide a communication system for performing or holding videoconferences between a plurality of participants who are present at different participant locations, which comprises a participant terminal or subscriber station at each location including a camera for producing a video source signal corresponding to the scene at the participant location, a monitor or other video sink means, i.e. video signal receiving and converting means, for receiving a video signal to generate or reproduce a picture or image, a microphone for generating audio source signals and a loudspeaker as audio receiver or sink means, i.e. audio signal and receiving and converting means, for receiving audio sink signals, i.e. transmitted audio source signals, and converting such signals to sound, and control means which can be manipulated to initiate communication with other participants and to control the images displayed. A central station is connected to all of the participant terminals and includes means for receiving source signals from and transmitting sink or received signals to all the participant terminals as well as storage units for storing in each case a large size picture and at least one small coarse grained picture for each active participant location or terminal, the central station having a programmed processor for receiving control signals from the participant terminals to control the display assembly and split screen of large and small or coarse pictures at the participant terminals individually. The central or control station also includes multiplexers for providing or outputting the video signals to the various video monitors at the participant terminals. The programmed processor includes a program read and write control for assembling the large and coarse pictures. Connecting lines are connected for switching between each participant terminal and the central station with the control lines having sufficient bandwidth for video, audio and control signal channels.

The inventive solution substantially requires only a first and final expenditure for the equipment of the central station for the videoconference system. It is important that every participating location needs, of course, a camera, a single monitor, and the usual microphone-loudspeaker means, i.e. a minimum of terminal equipment, and also the broad-band go and return channels needed in any case for any videoconference. Another considerable advantage of the invention is that no individual is needed for effecting the master control or composition of the picture or split screen display. The control is effected from every location individually, anytime as wanted and desired, without affecting the other locations, within several predetermined patterns. This is a new performance feature for videoconferencing. All the pictures under individual control, with the information displayable in size and arrangement on the local monitor, are produced by the central station of the videoconference system and correspondingly transmitted as a full size individual or mixed picture. The central station thus operates as an intermediary or exchange between sources and sinks, i.e. transmitting and receiving signal points, at the subscriber stations and, therefore, the relatively expensive equipment for this mediation and processing for all the connectable locations of individual video signals to image mixtures is needed only in this station and only to an extent actually required for the purpose. The same applies analogously to the far less expensive processing and mediation in the audio section.

Particularly advantageous embodiments of the invention include respective features which provide various advantages which will now be discussed.

If picture storage units and multiplexers are employed for video signals in digital form, conventional networks can be used, as before, equipped for transmitting analog signals. As far as the connecting lines are concerned it should be possible to make sure that future requirements imposed on quality will also easily be met, or at least not be difficult to meet. Such requirements regard the transmission bandwidth of TV standard, e.g. 5 MHz, or future dgital HDTV (high definition television) instead of PICTUREPHONE standard with presently 1 MHz; and audio channels of hi fi quality, e.g. 10 KHz, instead of telephone quality bandwidth, usually 3 KHz. Since even in local networks advance systems with a broadband signal transmission through optical fibers, i.e., multimode gradient fibers, have already been provided, single mode systems must also be considered in both the local and long distance regions.

Obvious limits are set on the number of participants in any conference, not only videoconferences. This limit is from two to not more than about twelve participants. According to the invention central stations can be equipped with any number of picture storage units and multiplexers but at least with a number needed for a single videoconference. With a sufficient number, the equipment may then be interconnected in the central station to groups for every one of the conferences, with a set of corresponding control devices for each of these groups.

The problem of how to make the video signals coming from the individual sources available in the central station, as both a complete or full screen picture, or a split screen picture composed of a large picture and at least one coarsened picture, i.e., reduced or small picture, can be solved, as to the hardware, with picture storage units, for example, having a storage capacity exceeding that of a large picture, i.e. a full screen picture. That is, the large pictures and small pictures are stored already in the way or size in which they are later to be available. However, since in a mixed or split screen picture comprising a large picture and a plurality of small ones, the large picture must be somewhat smaller than the screen, i.e. particularly such that the marginal zones must be suppressed vertically and/or horizontally, at one or both sides, this can be done better in software terms while reading it out from a picture storage, than in hardware terms. Picture storage units having a capacity of only one complete or full screen picture are also possible in which the complete picture, a large picture, and small pictures are read out under a corresponding program control.

At every location, also the participant's own image can be displayed as a complete or full screen picture or a mixture or split screen picture arrangement on the individual monitors, since with the control freedom, there is no difference between the transmitting and the receiving location.

The size of a large picture and a coarsened picture, i.e., a small one, should of course be only as small as needed, and, as large as possible. Keeping the size of the complete, picture constant the size of the large picture can freely be chosen at every location, as a function of the number and size of the small pictures in the mixture, and conversely, within the pattern or raster of split screen variants predetermined by the central station.

For example, if at a location no display of split screen pictures of all the participants is provided, i.e. where a more or less narrow selection from the panel is preferred, or if only a few locations are interconnected for a videoconference, the small pictures may remain relatively large.

Every location may be occupied by as minimal as a single participant, which may even be the rule. With a plurality of participants at a location, they will be seated adjacent each other. Then a control instruction may be delivered to the central station to suppress in the picture received from this location only the horizontal margins, and to make available small pictures having a certain minimum width, for example, corresponding to only half the width of the pick up field.

If no picture control instruction is received from a location, a picture is delivered to this location corresponding to a standard program. This may take into account control instructions from other locations, majority decisions, etc. This also means that with a consent, a control keyboard as a terminal equipment elements may be omitted at a location without any functional disadvantage.

To produce small pictures, and thus reduce the number of picture elements in the picture, a low pass filtering may be provided. Portraits, however, furnish soft contours, so that with digital storage units, for example, only the writing rate is to be varied relative to a large picture storage. Written documents and objects etc. are usually always displayed as large or full pictures and if in such an instance a document is displayed in small size, with not quite distinct characters, even such a quality is satisfactory if it is capable of stirring interest in seeing a large, more distinct picture.

The individually selectable distribution in a split screen picture should be based on a structure pattern predetermined by a standard program of the central unit. For example, with five participants, one at each location, the participant at a given location might appear in a large picture, the other four in a vertical row of four small pictures at the right side of the screen. First the raster of the mixed or split screen picture is transmitted and each of the participants may now individually make changes in the raster.

The audio channels may be switched in parallel with the switching of the video signals, and in any case this is done also in the central station. Quite generally, conferences are kept to a speaking discipline, so that usually a single participant will be heard at any one time. Because of the large freedom permitted with the picture control, it may happen in the case of a parallel switching of audio and video channels, that only a large picture of a participant will appear at one location while another participant throws in an important comment which then will not be heard at that location. It is therefore advisable to transmit the audio signals of all the other sources as a summation signal to every sink or receiving point. In terminals with a two-channel sound reproduction, it is advantageous in addition to reproduce the speech signals belonging to the small pictures at the right-hand or left-hand side of a monitor, corresponding to the right or left audio channel, and the speech signals belonging to a large picture and to participants who are not in the picture at the same time, from the middle portion of the monitor.

A sound control with individually controllable sound mixers, i.e. controllable intermediate amplifiers or pre-amplifiers in the central station for every audio signal coming from a source, and suitable sound control equipment at the individual locations, make it possible to simulate the so-called "cocktail party effect".

That is, should one of the participants wish to concentrate acoustically on a certain other participant whose audio signal is too drowned out by the summation signal, he or she may increase through the audio control the level of the respective audio signal in the central station, and even decrease at the same time the other levels.

For this purpose, and also to permit an individual picture control, the participants may be aided with a useful expedient consisting of distinguishing marks which are permanently or temporarily mixed into the pictures and comprise figure or letter combinations, or pictorial characters, etc., and permit a quick and clear identification of a picture with the source and the corresponding button of the keyboard. These measures however, do not contribute to the sought directional accuracy in looking at and receiving the sound from the other participants.

Other embodiments of the invention are particularly advantageous from the viewpoint of communication technology. They may readily be employed in radial or star type networks, one of the most usual structures of public communication systems. To successfully conduct or perform a video conference, the central station therefore is of course to be located in the proximity of most of the participating locations. Locations which are far or very far away therefrom may be supplied at least through a common return channel, to save channel capacity and cost for long transmission, such as through intercontinential connections. In such an instance, of course, only individual control wishes of a single one of such remote locations can be taken into account. Changes in the control, however, may be agreed in the acoustical way, i.e. via the audio transmission.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Details of the invention are diagrammatically shown in the drawings in which.

DESCRIPTION OF THE PREFERRED EMBODIMENT

Figure 1:
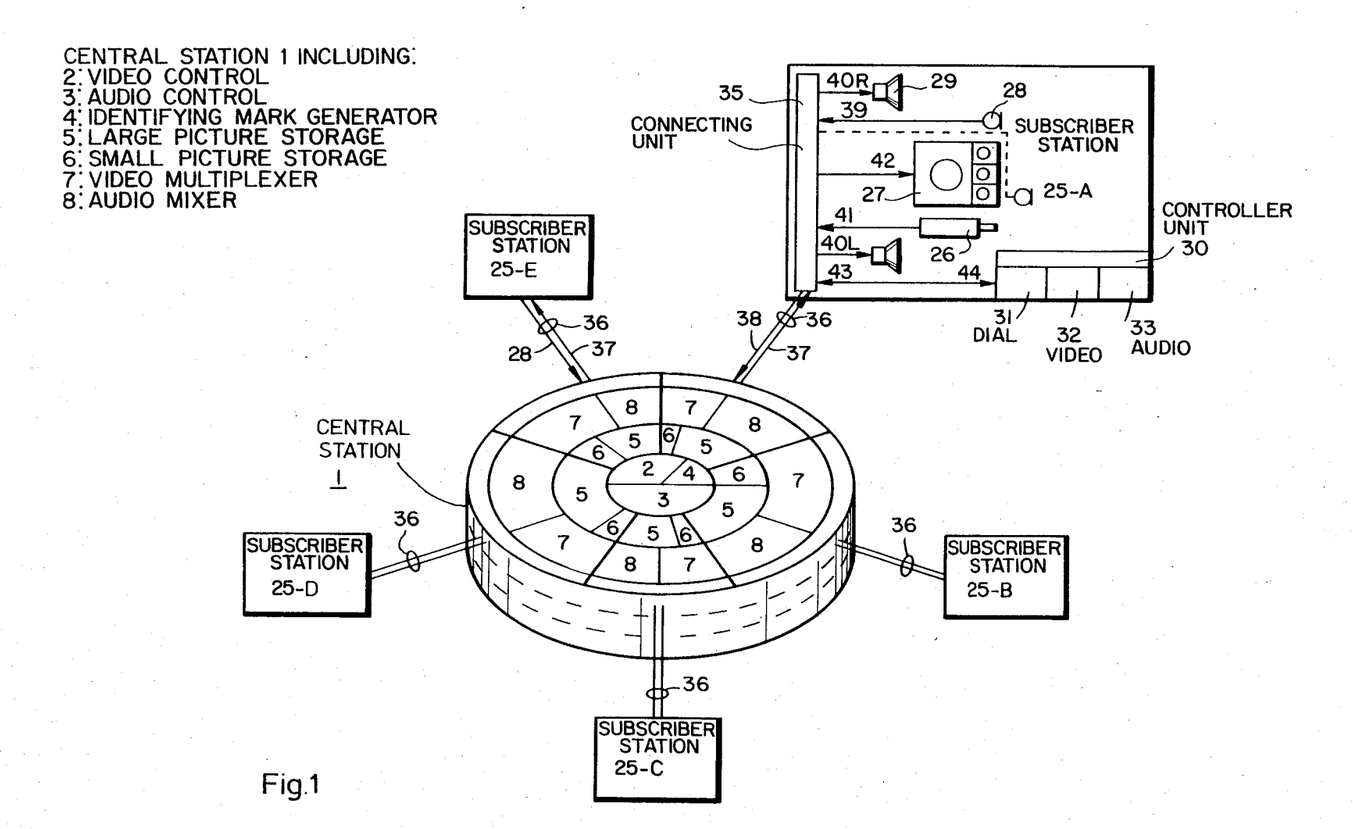
FIG. 1 is an overall diagram of a videoconference communication system.

FIG. 1 illustrates the concept of a system for videoconferencing according to the invention. Considering its performance, the system comes closest to those which are known under the designation of "working place videoconference". Such systems can conduct a videoconference between plural participants who are each at their own work place at spaced locations from each other.

At each of the selected connectable subscriber stations or terminal locations 25, five such locations or stations 25-A to 25-E being shown in FIG. 1, equipment is needed (see location 25-A where details are indicated) having a terminal connecting unit 35 for the following pieces of equipment 26 to 30:

sinks or receiving and converting means 27, 29 for video and audio signals 42, 40 (namely a monitor 27 and loudspeaker 29);

sources 26, 28 of video and audio signals 41, 39 (namely a camera 26 and microphone 28);

controller unit 30 (FIG. 12), comprising a dialling device 31, a video control selector 32 and an audio control selector 33, provided for establishing communication or entering control instructions.

The equipment may comprise to a very large extent conventional, commercially available means. Two or more channel stereophonic devices should be provided for the audio signals (picking up or recording, transmission, reproduction).

From such a location 25, one or several participants can hold a videoconference with participants at other, very remote and mutually independent locations 25, through connecting lines 36 and a videoconference central station 1.

Connecting lines 36 must be provided for a go channel 38 and a return channel 37. The go channel as well as the return channel require transmission capacities for a video broadband channel, an audio medium band channel, and a signal narrow band channel (not shown in FIG. 1).

An audio channel may also be dimensioned for a two-channel or multichannel sterophony. The signalling channel is needed initially for dialling or building up the communication and later, i.e. after the conference circuitry is established, occasionally for control instructions.

The equipment outside the videoconference central or control station 1 thus does not comprise more than that of a TV-standard picture-telephone station. This already is a substantial advantage of the invention since it makes any such picture-telephone station suitable for videoconferencing.

The videoconference central station 1 includes all equipment necessary for distributing and mixing the incoming source signals to form the outgoing signals transmitted to the receiving means, i.e. the sink signals, but only to the extent of satisfying the traffic needs of the videoconference. This equipment is assigned to the participating locations 25 always for the duration of a video conference and it substantially comprises large picture storages 5 and small picture storages 6 as well as multiplexers (MUX) 7 for the outgoing video sink or reception signals. For outgoing audio sink or reception signals 40, sound mixers 8 are provided. The large picture storages 5, small picture storages 6, multiplexers (MUX) 7, and sound mixers 8, needed for a certain connection are selectable in a number corresponding to the number of participating locations 25, and are interconnected to respective groups and associated with a video control 2 and an audio control 3.

Figure 2:
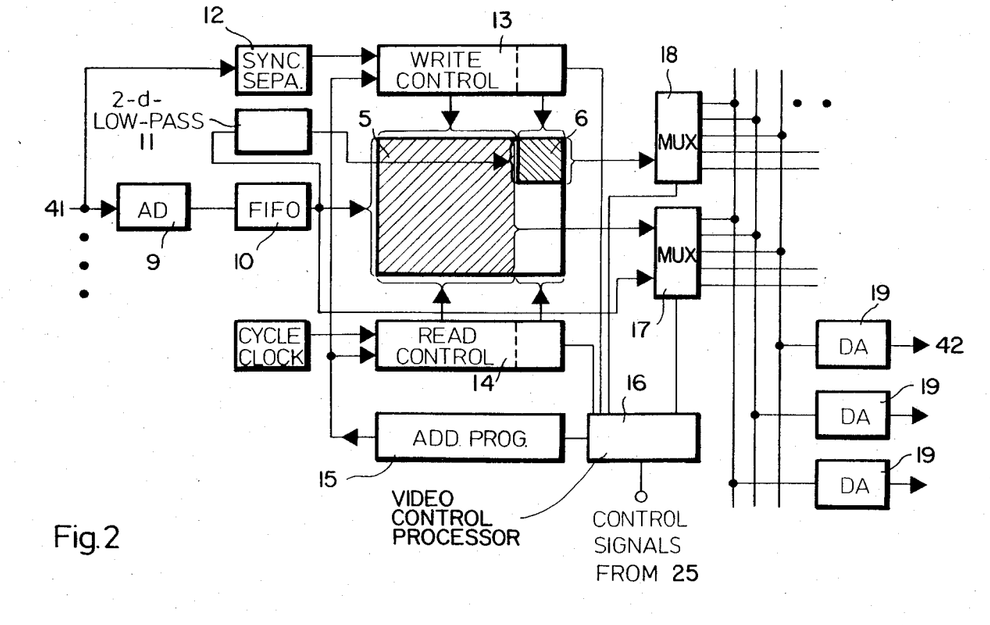
FIG. 2 is a simplified block diagram of the equipment for mixing, switching and transmitting video signals in the central station.

The structure and function of a videoconference central station 1 as far as video signals are concerned, may be learned from FIG. 2 where the control equipment in the central station 1 which is necessary for one participating location 25, is shown. The video source signals 41 coming from a camera 26 are supplied to an analog-to-digital converter 9 wherefrom they pass, through an intermediate or first-in-first-out buffer storage (FiFo) 10, if provided, to a large picture storage 5. Through a detecting and selecting synchronization separator 12, for example, the synchronizing information is retrieved from the incoming video signal 41, for a write control 13. Parallel to large picture storage 5 a coarsened or small picture, i.e. one whose number of picture elements is two-dimensionally reduced (width and height), is produced for example by low-pass filtering through low-pass filter (2-d-low-pass) 11, followed by subsampling effected by a corresponding setting of write control 13, and supplied to a small picture storage 6.

Figure 7:
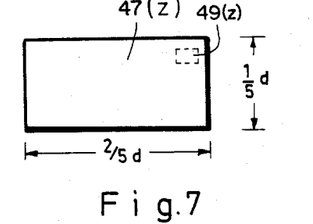
Figure 8:
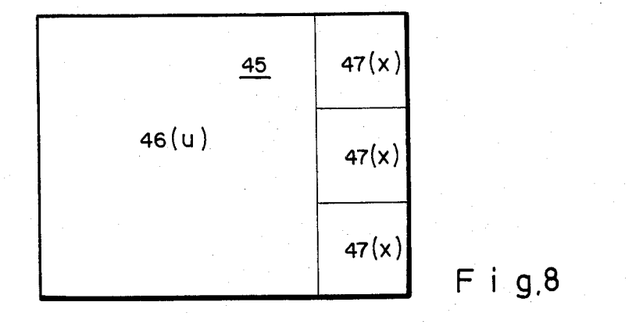
FIGS. 8 to 11 show variants of mixed or split screen pictures, composed of large and small pictures.

In a video control processor 16, a standard program is stored according to which mixed or split screen pictures of the individual large pictures 46(*u*), 46(*v*), 46(*w*) (FIG. 4) and/or small picture 47(*x*), 47(*y*), 47(*z*), (FIGS. 5 to 7), are combined to the size of a full or complete screen picture 45 (FIG. 8). By means of control signals which are received from the individual participating terminal stations or locations 25-A, 25-B, 25-C, 25-D, 25-E (up to 12 such stations) and include individual station split screen video controlling instructions, the video signals 42 for a complete or full screen picture 45, consisting of signals of large pictures 46 and small pictures 47 are directed, in accordance with the transmission clock frequency (cycle clock), by an addressing program processor 15 and a read control 14 and, if provided also by a write control 13, to multiplexers (MUX) 17, 18 and therefrom, through a digital-to-analog converter 19, as an individually composed monitor video signal 42 to the respective connecting line 36.

Figure 3:
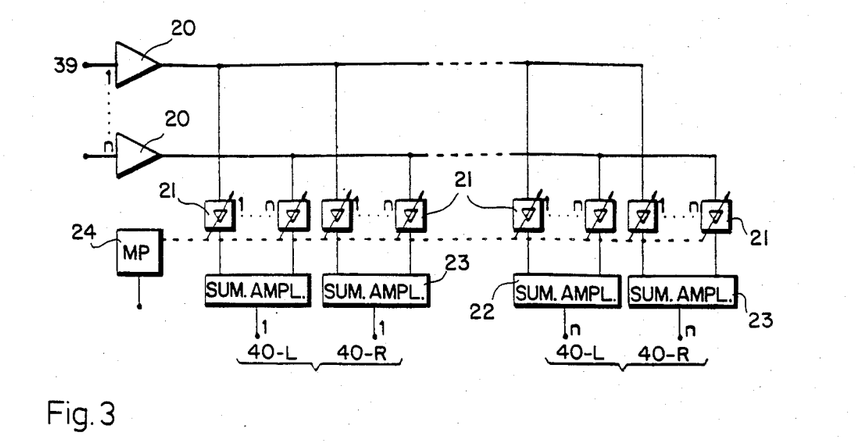
FIG. 3 is a simplified block diagram of the equipment for mixing, switching, and transmitting audio signals in the central station.

As to audio signals, the structure and function of the videoconference central station may be learned from FIG. 3. The audio signal 39 coming from a microphone 28 (FIG. 1) is amplified by a preamplifier 20 and passes through level adjustors or gain controls 21 to summation amplifier 22 for the left-hand channel and an identical amplifier 23 for the right-hand channel. Each participating subscriber station 25 receives its individual pair of output signals 40-L and 40-R for the left-hand and right-hand audio sink or receiver (such as loudspeakers 29-L and 29-R (FIG. 1)). The amplification and damping settings of the individual adjustors or gain controls 24 may be effected by means of an audio control program per programmed audio control processor 24. Particularly advantageous is blocking of the participant's own sound, to eliminate acoustic feedback.

For the audio control, which also may be effected according to a standard program applying to all the participating subscriber stations or locations 25, i.e. with or without overriding or control, the video conference central or control station 1 includes the sound mixer 8 and audio control 3 already mentioned in connection with FIG. 1. A cocktail party effect can be simulated in a simple way by setting the respective level adjustors 21, i.e. such that the audio signal 39 of the participant whose voice is to be emphasized is correspondingly amplified and those of the other participants are damped or attenuated.

Figure 4:
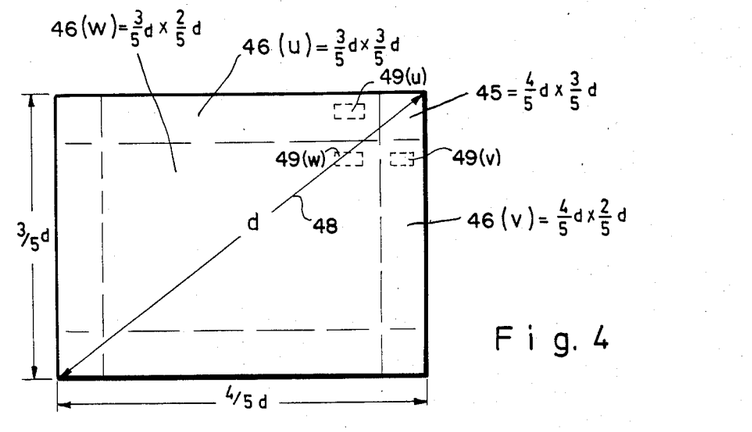
FIG. 4 illustrates the size proportion between a complete or full screen picture and three variants of large pictures.

FIG. 4 shows a monitor screen in true proportions according to the conventional TV standard. A complete or full screen picture 45 has a width of 4/5 d and a height of 3/5 d, with d being the diagonal 48 of the complete picture screen. Picture sizes which show a face while omitting horizontal or vertical, or horizontal and vertical, margins may be considered a large picture 46(*u*), 46(*v*), 46(*w*).

One of the variants of a large picture, 46(*u*), for example, is reduced only in its width and thus is a square of the dimensions 3/5 d and 3/5 d with d still being the diagonal 48 of the complete or full screen picture 45. Another large picture 46(*v*) having the width and height dimensions 4/5 d and 2/5 d is useful if a plurality of participants is to be shown which are all at the same terminal or location, since in such an instance only the horizontal margins are omitted. Still another large picture 46(*w*) having the width and height dimensions 3/5 d and 2/5 d has all the margins omitted.

Figure 5:
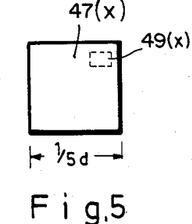
FIGS. 5 to 7 show three variants of small pictures.
Figure 6:
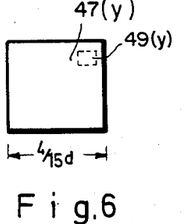

FIGS. 5, 6 and 7 show three different sizes of small pictures 47(*x*), 47(*y*), 47(*z*). All of these have the same height of 1/5 d, which permits the use of the marginal zones of all the large picture sizes 469(*u*), 46(*v*) and 46(*w*), shown in FIG. 4. The dimensions 1/5 d, 4/15 d and 2/5 d are provided as useful widths of small pictures 47(*x*), 47(*y*), and 47(*z*), respectively. Which of the small picture sizes to produce in central station 1 depends particularly on the provided maximum number of pictures of a split-screen combination to be shown. Stated another way, the particular large and small picture dimensions to be provided by the central station 1 depends on the maximum number of pictures which are to be displayed on a given split-screen. If a greater number of large and small picture sizes or dimensions is programmed or provided which are not all absolutely necessary, the number of possible combinations, i.e. the degree of freedom for selecting possible combinations forming one full screen picture, is correspondingly enlarged as well.

Figure 9:
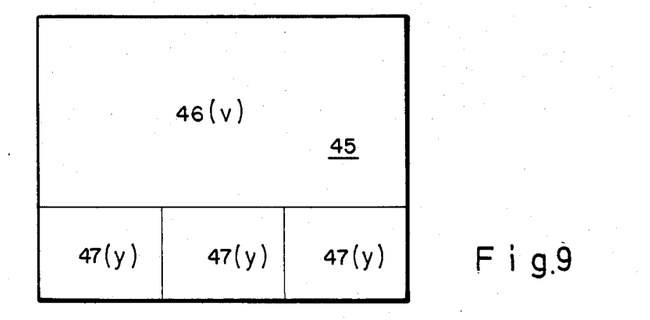
Figure 10:
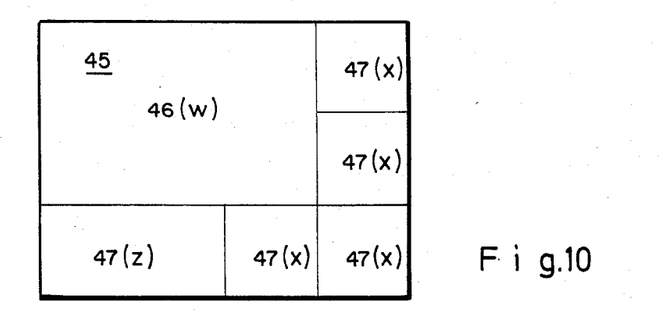

FIGS. 8, 9 and 10 show a selection of some examples of split-screen combinations of large pictures 46(*u*), 46(*v*) and 46(*w*) and small pictures 47(*x*), 47(*y*), and 47(*z*).

Figure 1A:
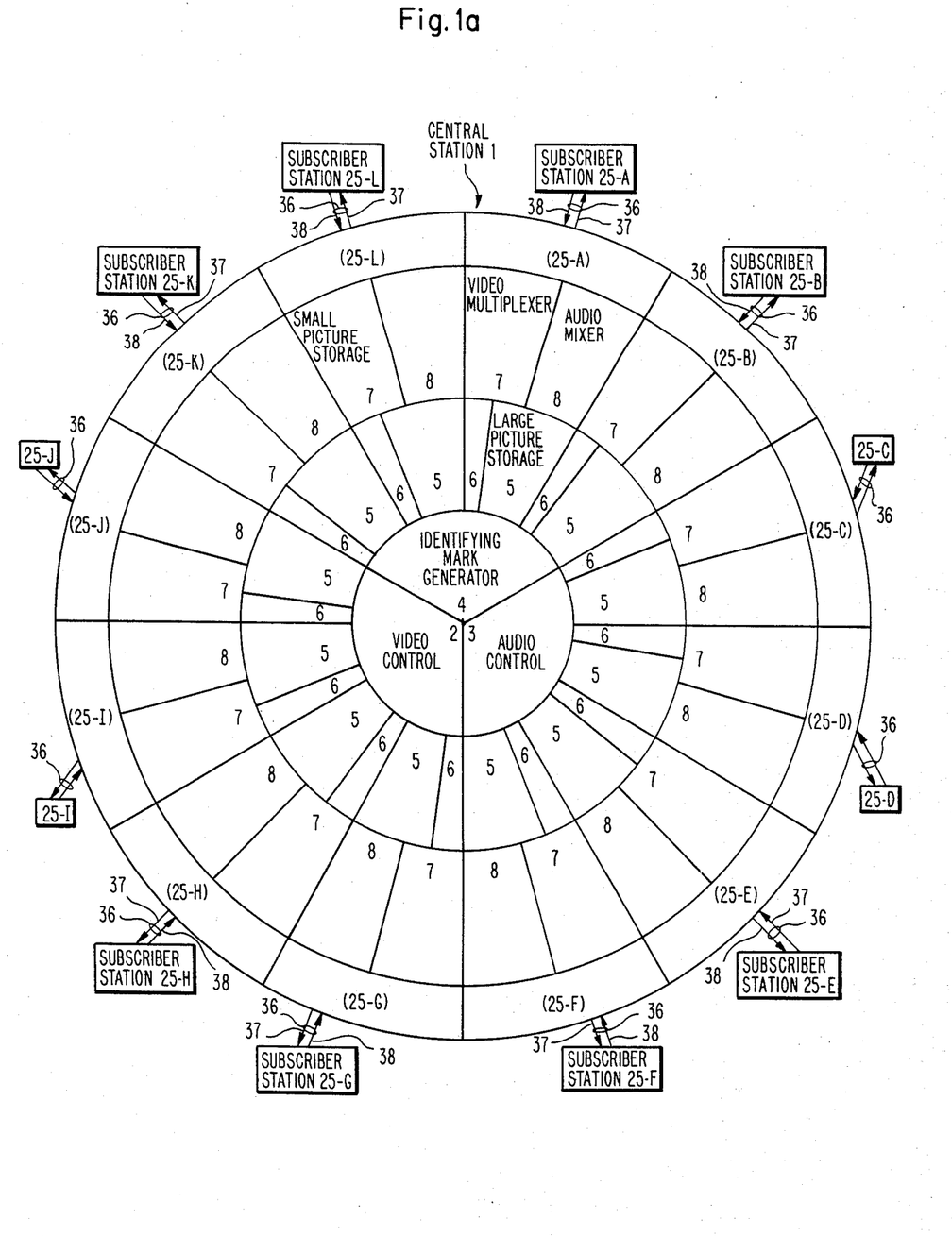
FIG. 1a is a 12 participant station system corresponding to FIG. 1.
Figure 11:
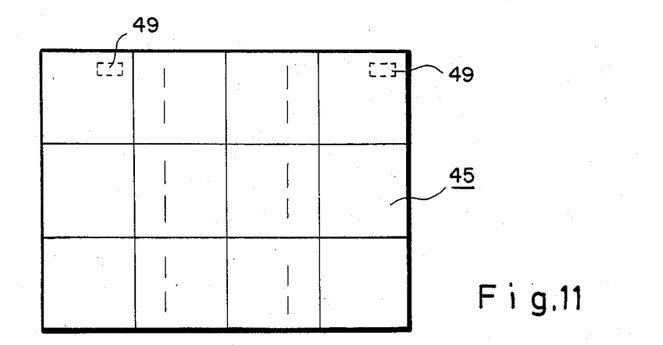

FIG. 11 shows the raster for a maximum of 12 small pictures 47(*x*) and, in broken lines, for a corresponding maximum of 9 small pictures 47(*y*). In each of the small picture areas, for example in one of the upper corners an identifying mark 49 for the respective participant at a respective subscriber station or terminal 25 may be reproduced, which is delivered by a special signal generator 4 which is in the central station 1 (see FIG. 1a).

Figure 12:
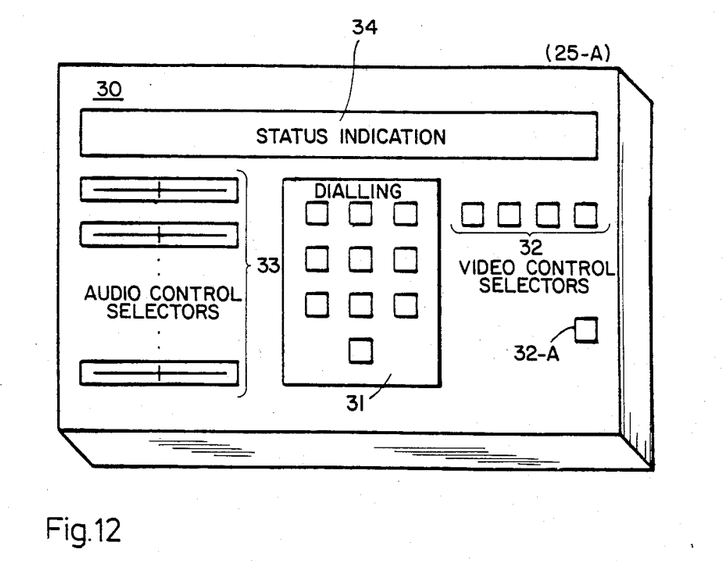
FIG. 12 shows a control desk unit with elements for selecting and controlling the sound and picture reproduction.

FIG. 12 is a diagrammatical perspective view of a controller unit 30 at a participant location or subscriber station 25, for carrying actuating elements needed by a participant to produce individual control instructions. More specifically, controller unit 30 comprises front panel controls 31, 32, 33 and a display unit 34 for individual control instructions.

The selection or dialling, audio control or video control instructions as the case may be, are entered respectively, by means of for example a conventional dialling keyboard 31 and switches 32 and audio control selector potentiometers 33. The instructions are transmitted through the terminal connecting unit 35 (see FIG. 1) to the central station 1. The participants receive checkback information on the status of the selector or dialling keyboard 31, the audio control 33, the video control 32, the terminal connecting unit 35, the central station 1, etc. through an optical indicator or display 34, such as signal lamps, alphanumeric display, etc.

Accordingly, the invention comprises a communication system for conducting or performing a videoconference between a plurality of participants who are located, optionally yet preferably as single participants, at a plurality of participant locations, i.e. at a plurality of participating subscriber stations, comprising;

a participant terminal or subscriber station 25 at each connectable participant location, each having video signal source means 26 for generating a video source signal 41 constituting the recording of the screen at the participant location, i.e. at the participant's terminal, video signal sink means for receiving and converting means 27 for receiving a video sink signal 42 to produce a complete or full screen picture 45, and selector means including a video control selector 32 for generating control signals 43 for controlling scene images or picture compositions, especially from other participating subcriber stations or locations used to make up the complete or split screen picture;

a central station 1 for receiving video source or originating signals 41 and control signals 43 from each participating subscriber station or terminal 25 and for outputting video sink or reception signals 42 to each such participating subscriber station or terminal, said central station 1 includng video storage means 5, 6 for storing received video source signals 41 from each such participating subscriber station or terminal as both a large picture 46 and a coarse or small picture 47, or as a full screen pictuer 45, multiplexer means (MUX) 7, 17, 18 connected to said video storage means 5, 6 and controllable to selectively provide video sink or received signals 42 corresponding to compositions of large and small pictues 46, 47 or, alternatively, to a particular full screen picture 45 from each participating subscriber station or terminal to each other participating subscriber station or terminal, video control means 2 connected to said video storage means 5, 6 and said multiplexer means 7, 17, 18 and responsive to control signals received from said participating subscriber stations or terminals to generate video sink signals 42 corresponding to a full screen pictuer 45 for each participating subscriber station or terminal selectively composed of large pictures 46 and small pictures 47, each showing the scene at a participating subscriber station or terminal 25, and said central station 1 further including programmable write and read means 13, 14 connected to said video storage means 5, 6 and to said video control means 2 for providing the large and small pictures 46, 47 from the video source signals for transmitting to each participating subscriber station or terminal 25 a corresponding video sink signal 42 which is received by video receiving and converting means 27 such as monitors and each showing an individually selected and composed split screen picture; and connecting lines 36 connected between each participating subscriber station or terminal 25 and said central station 1 for carrying said video source signals, said video sink signals and said control signals, each connecting line including go and return direction video and control signal channels 37, 38 of sufficient bandwidth to carry said video source, video sink and control signals between said participating subscriber stations or terminals and said central station, said go and return direction channels including narrow band signalling channels 43, 44, medium band audio channels 39, 40, and wideband video channels 41, 42, of correspondingly sufficient bandwidth.

While a specific embodiment of the invention has been shown and described in detail to illustrate the application of the principles of the invention, it will be understood that the invention may be embodied otherwise without departing from such principles.

We claim:

1. Communication system for performing a video conference among a plurality of participants who are present at a plurality of independent locations, especially where only a single participant is present at each such location, comprising:

a subscriber station at each participant location, each particular subscriber station including:

video source signal means for generating and transmitting a video source signal taken from a scene at said particular station, video reception signal means for receiving and displaying a video reception signal at said particular station, selector means including video control selector means for generating video control signals regarding individually selectable and collectively combinable pictures from all participating subscriber stations for correspondingly displaying at said particular station either an individually selected full screen picture or an individually combined split screen picture of a plurality of pictures which are correspondingly smaller than said full screen picture, audio source signal means for generating and transmitting an audio source signal from said particular station, audio reception signal means for receiving and converting to sound an audio reception signal at said particular station, and said selector means further including audio control selector means and connection control selector means for generating corresponding control signals;

a central station comprising:

means for receiving said video source signals and said video control signals from each participating subscriber station and for outputting said video reception signals to each participating subscriber station, video storage means for storing video signals corresponding to said video source signals received from participating subscriber stations, each said video signal to be stored representing either a full screen picture or both a large picture and a small picture, each of which large picture and small picture is correspondingly smaller than said full screen picture, multiplexer means connected to said video storage means and controllable to provide for each of said participating subscriber stations a particular video reception signal representing either an individually selected full screen picture or an individually combined split screen picture of said plurality of smaller pictures or of a corresponding plurality including both a said large picture and said small pictures, video control means connected to said video storage means and said multiplexer means and responsive to said video control signals received from said participating subscriber stations to provide said video reception signals corresponding to either a full screen picture or a split screen picture for each of said participating subscriber stations as individually or collectively selected, programmable write and read means connected to said video storage means and to said video control means for controlling the corresponding size and disposition of large and small pictures for composing a split screen picture, and means for receiving audio source signals and audio control signals from each said participating subscriber station and for outputting audio reception signals to each said participating station, and means for receiving audio connection control signals from each said participating station; and connecting lines connected between each said subscriber station and said control station, each said line having corresponding go and return channels of a sufficient bandwidth for transmitting source signals in a go direction and reception signals in a return direction, and correspondingly for transmitting said video signals in a wideband channel, said audio signals in a medium bandwidth channel and said control signals in a narrow band channel.

2. System of claim 1 wherein at each said subscriber station said video source signal means comprises a video camera, said video reception signal means comprises a video monitor, and said video control selector means includes manually operatable switches either for selecting the composition of a video reception signal with respect to the video source signals from all participating subscriber stations which are used to provide said plurality of smaller pictures which together form a split screen picture on said video monitor, or for selecting the video composition of a video reception signal with respect to the video source signal from a particular participating subscriber station which is used to provide said large picture, and with respect to video source signals of other participating subscriber stations which are used to provide said small pictures, and which together form a split screen picture on said video monitor.

3. System of claim 1 wherein said central station includes analog-to-digital converter means connected at an input of said video storage means and provided for receiving and converting said video source signals into digital signals for storage in said video storage means, and further includes digital-to-analog converter means connected at outputs of said multiplexer means for converting digital signals from said video storage means into analog signals to make up said video reception signals for said participating subscriber stations.

4. System of claim 1 wherein a plurality of said video storage means and multiplexer means is correspondingly provided for storing, providing and outputting signals separately for each of a number of independent groups of participating subscriber stations among said plurality of subscriber stations for correspondingly performing separate video conferences among the participating subscriber stations corresponding to such groups at the same time, a single video control means being provided for controlling all said video storage means and multiplexer means.

5. System of claim 1 wherein said video storage means are provided for storing video source signals corresponding to said large and small pictures and have a storage capacity for such a large picture and for a plurality of such small pictures, each small picture being smaller in size and coarser grained than said large picture and said large picture being smaller than said full screen picture.

6. System of claim 1 wherein each video source signal corresponds to a two dimensional full screen picture taken from a scene at its respective participating subscriber station, said central station includes a low pass filter, and said low pass filter and said write means are connected to said video storage means for reducing the number of picture elements of a full screen picture in two dimensions, for providing said plurality of pictures which are correspondingly smaller than said full screen picture as the pictures to be stored in said video storage means.

7. System of claim 6 wherein said programmable write and read means is connected to said video storage means and operates in association with said video control means for reducing the number of picture elements of each full screen picture by an amount dependent upon the number of participating subscriber stations and the number of participants at the particular participating subscriber stations for providing said plurality of pictures which are correspondingly smaller than said full screen picture and which plurality corresponds to the programmable number of participants at said number of participating stations to be included in a split screen picture.

8. System of claim 7 wherein said programmable write and read means is programmed to provide a large picture and a plurality of small pictures for each participating subscriber station in a pattern which is predetermined by the program of said write and read means to form a split screen picture, said large picture and said small pictures each being smaller than said full screen picture.

9. System of claim 1 wherein said central station includes a signal generator for introducing into each full screen picture, large picture and small picture a corresponding distinguishing mark identifying a particular participating subscriber station.

10. System of claim 1 wherein said central station, said connecting lines and said subscriber stations form a star type network having its center at said central station and said connecting lines extending outwardly from said center and to said subscriber stations.

11. System of claim 10 wherein said connecting lines each include said corresponding go and return channels.

12. System of claim 1 wherein:

said audio control selector means generates corresponding audio control signals for controlling individually selected mixings of audio source signals from other participating subscriber stations; and said means for receiving audio signals at said central station comprising:

audio mixer means for multichannel mixing and transmitting of audio reception signals, said audio mixer means being connectable to said connecting lines, and audio control means connected to said audio mixer means and responsive to said corresponding audio control signals from said audio control selector means of said participating subscriber stations for selectively supplying said audio mixer means with audio source signals received by said central station from said participating subscriber stations and for outputting audio reception signals individually mixed for powering said audio reception signal means at said participating subscriber stations for reproducing sounds corresponding to sounds originating at other participating subscriber stations.

13. System of claim 12 wherein said audio control means is associated with said video control means and said audio mixer means and includes corresponding programmed processer means for establishing a distribution of audio reception signals to participating suscriber stations in concordance with the composition of the video reception signal distributed to a particular participating subscriber station.

14. System of claim 13 wherein said video source signal means comprises a video camera, said video reception signal means comprises a video monitor, said audio source signal means comprises an audio microphone, and said audio reception signal means comprises at least one loud speaker.

15. System of claim 14 wherein said audio reception signal means comprises a first loud speaker for reproducing an audio reception signal summing audio source signals from those participating subscriber stations from which the video source signals originate for all corresponding small pictures which are displayed as such small pictures at a respective participating subscriber station, and a second loud speaker for reproducing an audio reception signal from that participating subscriber station from which the video source signal originates for the large picture which is displayed as such a large picture at said respective participating subscriber station.

* * * * *